United States Patent [19]

Beun

[11] Patent Number: 5,576,938
[45] Date of Patent: Nov. 19, 1996

[54] ELECTRONIC CIRCUIT PACK AND MOUNTING FRAME COMBINATION

[75] Inventor: Roger A. Beun, Kanata, Canada

[73] Assignee: Northern Telecom Limited, Montreal, Canada

[21] Appl. No.: 514,881

[22] Filed: Aug. 14, 1995

[51] Int. Cl.$^6$ ................................................. H02B 1/01
[52] U.S. Cl. .................... 361/829; 361/752; 361/796; 361/759; 439/535; 174/50
[58] Field of Search .................. 361/608, 725, 361/726, 727, 752, 753, 759, 796, 815, 823, 829; 439/535, 536, 538, 540, 544, 638, 570, 571, 58, 527; 220/34, 36, 402, 315; 174/55, 50, 61, 66; 211/41, 26; 455/300

[56] References Cited

U.S. PATENT DOCUMENTS

| | | | |
|---|---|---|---|
| 5,013,260 | 5/1991 | Caveney et al. | 439/535 |
| 5,044,987 | 9/1991 | Tihanyi | 439/560 |
| 5,145,380 | 9/1992 | Holcomb et al. | 439/49 |
| 5,253,140 | 10/1993 | Inoue et al. | 361/1728 |
| 5,290,175 | 3/1994 | Robinson et al. | 439/540 |

*Primary Examiner*—Leo P. Picard
*Assistant Examiner*—Y. Whang
*Attorney, Agent, or Firm*—R. J. Austin

[57] ABSTRACT

Electronic circuit pack and mounting frame in which a drawing device is provided to draw the pack into the frame to mate connectors of the pack and frame. A guide arrangement of slots and received guide pins is provided to hold the pack in correct orientation during the drawing process. Hence, the connectors are correctly aligned and incorrect mating and resultant connector damage is prevented.

4 Claims, 3 Drawing Sheets

ELECTRONIC CIRCUIT PACK AND MOUNTING FRAME COMBINATION

This invention relates to electronic circuit pack and mounting frame combinations.

Electronic circuit packs are known which are receivable into receiving stations in shelves or frames of telecommunications or other electronic equipment. These packs are normally connected by connectors at the rears of the shelves to back planes. At the front ends of the circuit packs, it is not uncommon for connectors also to be provided for connection by mating connectors to signal conductors extending to other circuit packs in the same frame or to other items of equipment exteriorly of the frame. In such cases, where there is more than one mating connector mounted on signal conductors for connection to a connector or connectors at the front end of a particular circuit pack, there is sometimes a problem in avoiding confusion as to mating connection positions during initial installation or during maintenance or repair. Furthermore, the mating connectors for connection to the front ends of the circuit packs are vulnerable to damage either during use or during maintenance as, in the latter circumstance, mating connectors tend to be left hanging loosely on their associated conductors.

U.S. Pat. No. 5,121,740 recently granted to Dittburner et al describes a circuit pack and a mounting frame combination having a mating connector for mating with a circuit pack connector and a connector holder which carries the mating connector. This structure has means to control movement of the connector holder so as to ensure straight line action of the mating connector when connecting it to and disconnecting it from the circuit pack connector. While the invention described in this prior patent overcomes certain alignment problems, its alignment accuracy does not fully meet that required when fiber connectors are to be mated at fronts of circuit packs. Such fiber connectors have telescoping sleeve arrangements. in each terminal which need absolute axial alignment as the connectors are being mated together. Alignment springs are provided for each terminal to assist in aligning the sleeves during the telescoping action. However, when a plurality of such terminals are provided in linear array along the connectors, there is a tendency for there to be a spring out of balance from end-to-end of the connectors which causes tilting of the mating connector relative to the circuit pack connector as mating proceeds. Present structures have not successfully combated this tendency when joining a mating connector to the front of a circuit pack connector.

The present invention seeks to provide a structure which minimizes or avoids the latter problem.

According to the present invention there is provided an electronic circuit pack and mounting frame combination comprising: a circuit pack having a front end with at least one telecommunications connector located at the front end; a mounting frame having a receiving station with an opening at a front of the frame for receiving the circuit pack into the front of the frame with the front end of the circuit pack at the front of the frame; a mating connector for mating with the circuit pack connector, and a connector holder carrying the mating connector; and means for drawing the connector holder into the mounting frame while connecting the mating connector with the circuit pack connector, the drawing means comprising two planar members synchronizably pivotable upon the holder and having two guide pins secured, one to each member, in locations maintained symmetrically one on each side of a center line of movement of the mating connector as it is being drawn into the frame, the two guide pins movable along guide channels defined by the frame upon synchronous pivoting of the planar members so as to draw the connector holder into the frame and hold the mating connector, during its movement, with its terminals axially aligned with the terminals of the circuit pack connector.

In practice, the two guide pins acting in spaced positions one on each side of the center line of movement prevent any tilting of the connector holder and thus of the mating connector relative to the circuit pack connector. Thus, alignment of the mating connector with the circuit pack connector is ensured during the whole insertion operation. In particular, while the invention ensures that terminals are maintained correctly aligned during mating, the invention is useful when mating optical fiber connectors having a plurality of linearly arrayed optical fiber terminals.

Preferably, to obtain the required symmetrical and synchronous movement of the two guide pins, the two planar members are two in-mesh gears with equal pitch circle diameters, each gear having a guide pin affixed thereto in a position spaced from the pivotal axis of the gear. This arrangement ensures synchronous movement of the pins with the movement of one pin being identical, but of opposite hand, to that of the other.

In addition to this, in a practical construction each guide channel has a first end portion for initial engagement by its associated guide pin, the first end portion extending rearwardly at an angle to the direction of movement of the holder so as to draw the holder into the frame. Each guide channel also has a second end portion extending forwardly from the first end portion and also at an angle to the direction of movement of the holder. This allows for termination movement of the holder into the frame and resists any tendency to remove the holder from the frame.

One embodiment of the invention will now be described, by way of example, with reference to the accompanying drawings, in which:-

Figure 1:
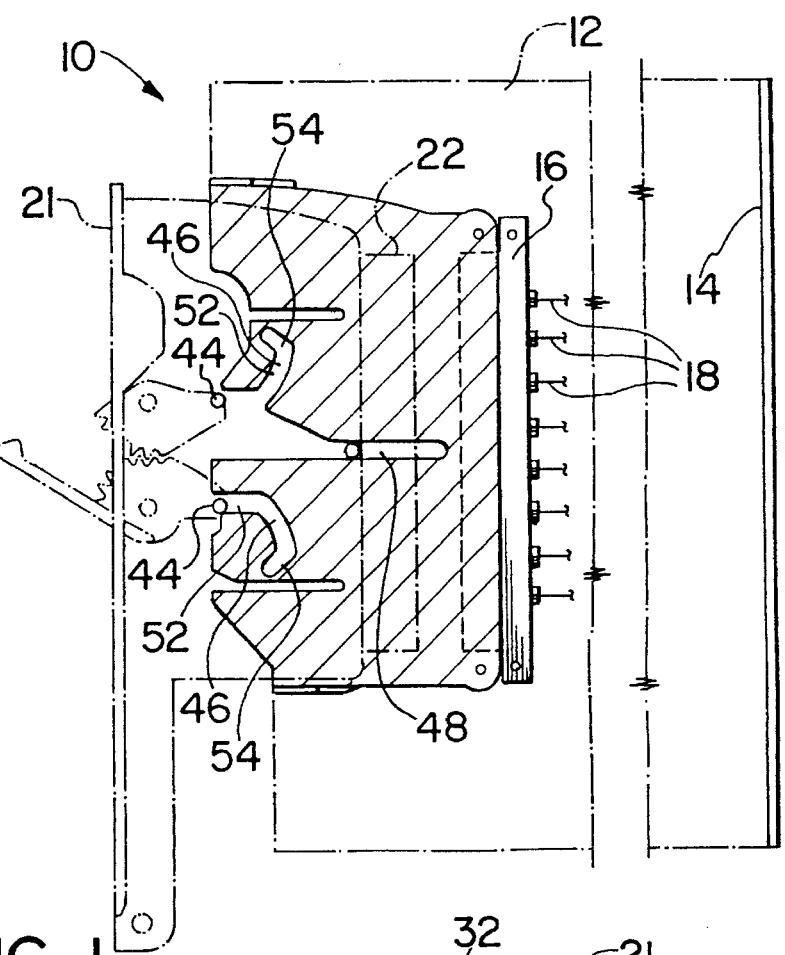
FIG. 1 is a cross-sectional view through a shelf of electronic equipment, the shelf housing an electronic circuit pack.

In a first embodiment as shown in FIG. 1, in an electronic circuit pack and mounting frame combination, the mounting frame comprises a shelf 10 for receiving electronic circuit packs 12 (one only being shown). The circuit packs are inserted through a front of the shelf in the direction of the arrow and into a plurality of side-by-side receiving stations in the shelf in which each circuit packs is electrically connected to a back plane 14 in conventional fashion. At the front end of each circuit pack 12, there is provided an optical fiber connector 16 which faces forwardly and has terminals, the rear ends of which are connected to optical fibers 18, as shown in FIG. 1. Front ends of the terminals are for connection to mating terminals in a mating connector as will be described.

Figure 4:
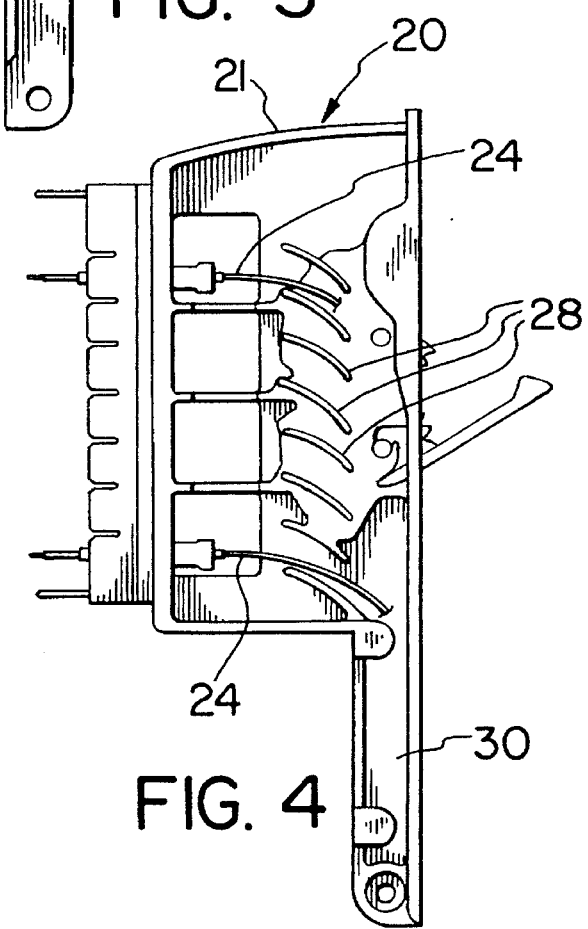
FIG. 4 is a view of the assembly from the opposite direction to FIG. 3.

The combination also comprises a connector holder 20 for each of the circuit packs 12, each holder 20 carrying a mating connector 22 for mating with the connector 16 at the front of its associated circuit pack. As shown particularly in FIG. 2, the connector holder 20 provides a housing 21 which enshrouds a part of the mating connector 24 and, as shown by FIG. 4, also enshrouds terminal end portions of optical fibers 24 which extend to forward ends of terminals of the connector 22. The holder 20 is equipped, as shown by FIG. 4, with curved guide walls 28 for guiding the fibers 24 from the terminals 26 to a lower end 30 of the holder and while ensuring that the fibers 24 do not bend below a desired minimum bend radius.

Means is provided for drawing the connector holder (together with its mating connector 22) into the shelf while ensuring that neither the holder nor the mating connector tilt during this movement. This tilting would mainly take place in the plane of the figures of the drawings and could cause problems with regard to alignment of the optical fiber terminals of the connectors and could also cause damage to the terminals in the connectors. The connectors 16 and 22 are of a type in which terminals have telescoping sleeves which interengage as the two connectors mate together and springs are associated with the telescoping sleeves for assisting in alignment and connection. Unfortunately, when a plurality of terminals are arranged in planar array as with the connectors 16 and 22, an out-of-balance may result from end-to-end of the connectors as a result of the use of the springs and this could cause the tilting referred to.

Figure 2:
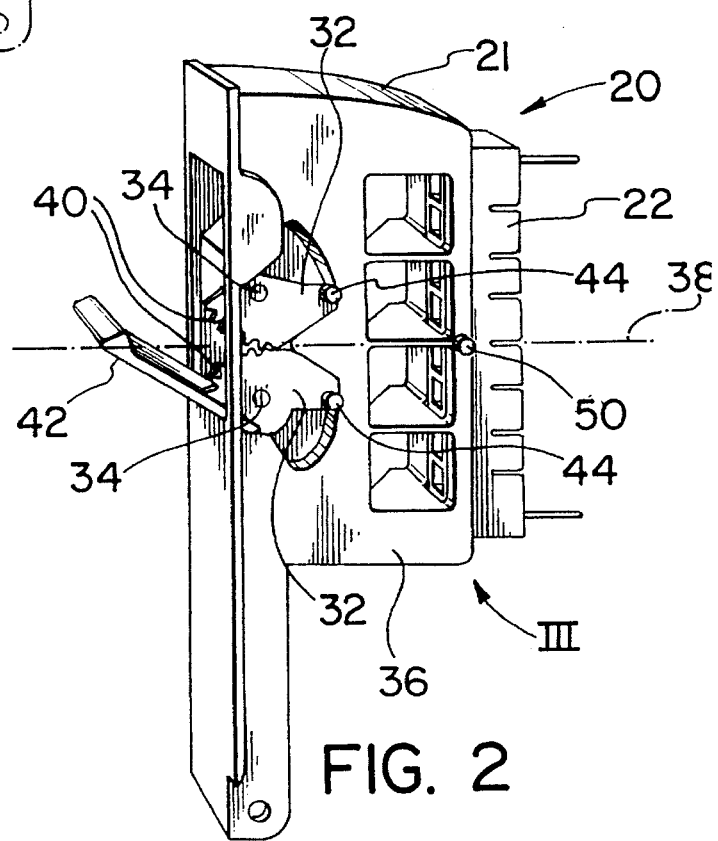
FIG. 2 is an isometric view, taken from the front, of a connector holder and mating connector for mating with a connector of the circuit pack, and also showing a means for drawing the holder into the shelf, the means shown in one position.

The drawing means comprises two planar members which are synchronizably pivotable upon the holder. These two members are in the form of two in-meshing gears or gear segments 32 (FIGS. 2 and 3 particularly) which are pivotally mounted upon pins 34 exteriorly of one wall 36 of the holder 20. The pivot pins 34 are equally spaced from a horizontal center line 38 of the connector 22 with the two gears having their gear teeth 40 in-mesh on the center line 38. A lower of the two gears is equipped with a manually operable lever 42 which, with the gears rotated to a position as shown in FIG. 2, projects outwardly from the front of the holder. With the gears in another mesh position shown in FIG. 3, the lever 42 has been pivoted clockwise from the FIG. 2 to the FIG. 3 position so as to lie flush with the front of the holder. Each gear 32 is also provided with a guide pin 44, the two guide pins located at equal distances apart from the rotational axes of the pins 34 and at corresponding locations on the two gears.

Figure 3:
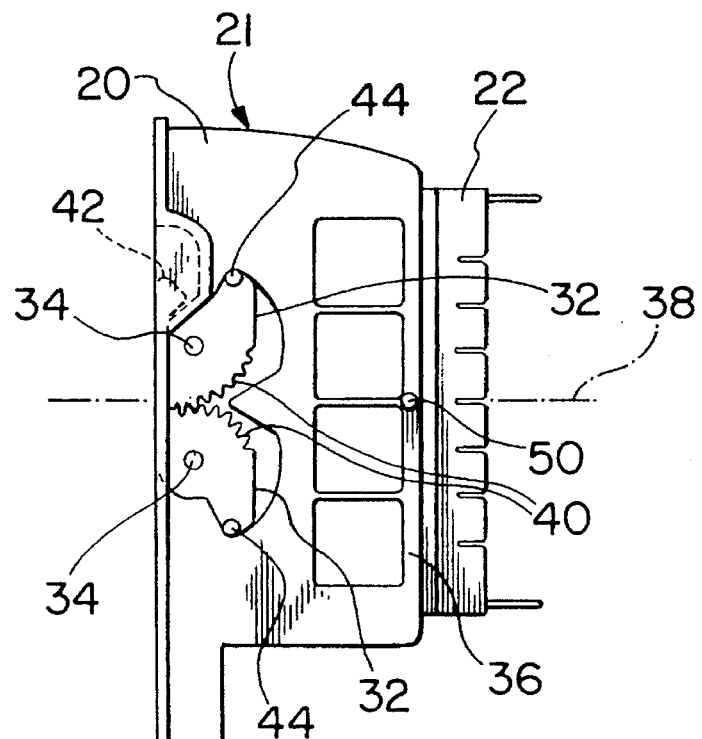
FIG. 3 is a side elevational view in the direction of arrow III in FIG. 2 of the connector holder and mating connector assembly with the drawing means in a different position.

The drawing means also comprises two guide pin receiving channels 46 (FIG. 1) for receiving the guide pins 44 and for allowing the guide pins to proceed along the channels as the lever 42 is pivoted between the FIGS. 2 and 3 positions. The guide channels 46 are of opposite hand to each other and are of identical shape except that an upper of the guide channels merges with a further guide channel 48 which is rectilinear and is symmetrically positioned along the center line 38. This guide channel 48 is for acceptance of another pin 50 which also extends from the wall 36 of the holder 20.

Figure 5:
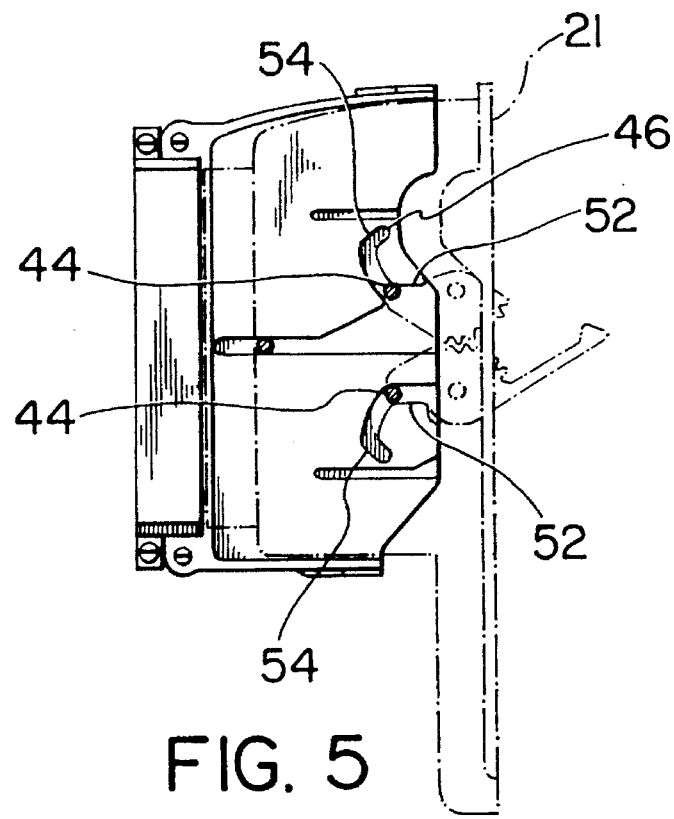
FIGS. 5 and 6 show different stages in the assembly of the connector holder and mating connector into the shelf.
Figure 6:
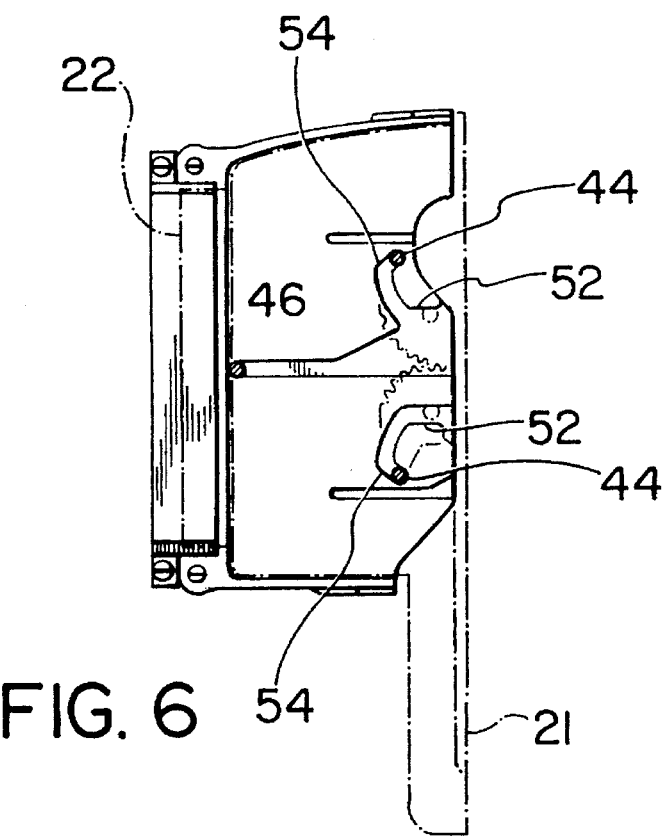

To assemble the connector holder 20 and the mating connector 22 into its receiving station in the shelf, the lever 42 is initially in the position shown in FIG. 2, i.e. in its downward, forward projecting position. This retains the in-mesh gears 32 in a position such that the two guide pins 44 lie in alignment with front end portions 52 of the guide channels 46. The connector holder is then moved into the receiving station and initially the pin 50 is received by the guide channel 48 so as to centralize the connector holder with the receiving station in the vertical direction. As the insertion of the holder continues the two guide pins 44 slide into the front end portions 52 of the guide channels 46 (see FIG. 1). The lever 42 is then pivoted upwards which causes the two in-meshed gears 32 to pivot about their pivot pins 34 and the pins 44 are caused to rotate around the pivot pins in opposite directions as shown by a comparison of FIGS. 2 and 3. This action of the guide pins 44 causes the pins to move along the guide channels 46 while also drawing the connector holder 20 into the receiving station. Because the guide pins 44 are maintained the same distance apart from the center line 38 and their front to rear positions are maintained equal upon the holder 20, then the holder moves into the receiving station without any tilting taking place in the plane of the drawings. Thus, the guide pins 44 start initially at the front end portions 52 of the guide channels, as shown by FIG. 1, and then move through a position shown in FIG. 5 with the connector holder moving into the receiving station. Movement of the lever 42 continues to the vertical position shown in FIG. 3 during which the guide pins 44 move from the first end portions of the guide channels to second end portions 54 which extend forwardly from the first end portions while moving away from the center line 38 (FIG. 6). This final movement draws the connector holder into its fully received position in the shelf with the mating connector 22 fully connected to the connector 16.

During the insertion procedure, the relative positions of the guide pins are maintained by the in-mesh gears which guarantee that any out of balance force applied by the springs in the terminals of the two connectors cannot produce any tilting action of the holder. In addition, with the pins 44 received at the forwardly facing ends of the second end portions 52 of the guide channels, the direction of the second end portions resists any tendency for enforced withdrawal of the connector holder from the shelf. The only satisfactory way of removing the guide holder is thus to pivot the lever 42 back to its position of FIG. 2. This movement automatically causes the guide pins 44 to return along the guide channels 46 thus automatically effecting forward movement of the connector holder to remove it and the mounting connector 22 from the shelf.

It is clear from the above described embodiment that the drawing means is completely effective in maintaining correct alignment of a mating connector being inserted into a circuit pack connector while eliminating any possibility of damage or jamming together of the mating terminals.

What is claimed is:

1. An electronic circuit pack and mounting frame combination comprising:

a circuit pack having a front end with at least one telecommunications connector located at the front end;

a mounting frame having a receiving station with an opening at a front of the frame for receiving the circuit pack into the front of the frame with the front end of the circuit pack at the front of the frame;

a mounting connector for mating with the circuit pack connector, and a connector holder carrying the mating connector;

and means for drawing the connector holder into the mounting frame while connecting the mating connector with the circuit pack connector, the drawing means comprising two planar members synchronizably pivotable upon the holder and having two guide pins secured, one to each of the planar members, in locations maintained symmetrically one on each side of a center line of movement of the mating connector as it is being drawn into the frame, the two guide pins movable along guide channels defined by the frame upon synchronous pivoting of the planar members so as to draw the connector holder into the frame and hold the mating connector, during its movement, with its terminals axially aligned with the terminals of the circuit pack connector.

2. A combination according to claim 1 wherein the two planar members comprise two gears with equal pitch circle diameters, the two gears being in-mesh, and each gear has a guide pin affixed thereto, the two guide pins being equally spaced from the pivotal axes of their respective gears.

3. A combination according to claim 2 wherein each guide channel has a first end portion for initial engagement by its associated guide pin, the first end portion extending rearwardly at an angle to the direction of movement of the holder so as to draw the holder into the frame, and a second end portion which extends forwards from the first end portion and also at an angle to the direction of movement of the holder so as to terminate movement of the holder into the frame and resist any tendency to remove the holder from the frame.

4. A combination according to claim 3 wherein the connector holder is provided with a centralizing pin for centering the mating connector with the circuit pack connector during commencement of movement of the holder into the frame, the centralizing pin receivable within a centralizing guide channel provided by the frame.

* * * * *